Aug. 22, 1961   D. QUAN   2,997,229
MEANS FOR REMOVING MOISTURE FROM A SURFACE
Filed April 8, 1958

INVENTOR
D. QUAN
BY: Maybee & Legris
ATTORNEYS

United States Patent Office 2,997,229
Patented Aug. 22, 1961

2,997,229
MEANS FOR REMOVING MOISTURE FROM A SURFACE
Dick Quan, Toronto, Ontario, Canada, assignor to Orenda Engines Limited, Malton, Ontario, Canada, a corporation of Canada
Filed Apr. 8, 1958, Ser. No. 727,183
4 Claims. (Cl. 230—132)

This invention relates to means for removing moisture from a surface traversed by a high-velocity flow gaseous fluid, and while not limited thereto, is particularly concerned with means for removing moisture from a surface of a member located in an air intake duct of a gas turbine engine. As will be apparent, the means of the invention has application in structures other than in a gas turbine engine, for example, it may be used advantageously in wind-tunnel constructions, and in the construction of aerofoil surfaces of aircraft or other high speed vehicles.

The object of the invention is to provide an extremely simple structure which will mitigate or eliminate the need to provide thermal or chemical systems for removing ice accretions formed on a surface by the freezing of moisture carried by the gaseous fluid and precipitated on the surface.

According to the invention, the means for removing moisture from a surface traversed by a high-velocity flow of gaseous fluid comprises an upstream surface portion terminating in a downstream edge, a downstream surface portion discontinuous with the upstream surface portion, and an intermediate surface portion providing a transition between the downstream edge of the upstream surface portion and the downstream surface portion, the upstream, the downstream and the intermediate surface portions in combination providing a discontinuity in the surface in the form of a step having a riser constituted by the intermediate surface portion and facing in a downstream direction, whereby, when the surface is traversed by the flow of gaseous fluid, moisture appearing at the downstream edge of the upstream surface portion is carried into the flow of gaseous fluid and clear of the downstream surface portion.

Preferably the discontinuity in the surface is located in the region of maximum velocity of flow of the gaseous fluid across the surface, the height of the step providing the discontinuity, when measured in a direction perpendicular to the downstream surface portion adjacent an upstream edge thereof, preferably being in the order of 0.100 inch and not less than 0.050 inch.

Figure 1:
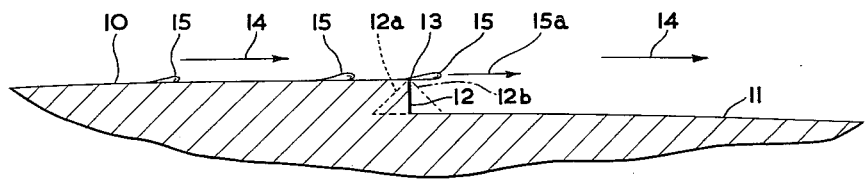
Figure 2:
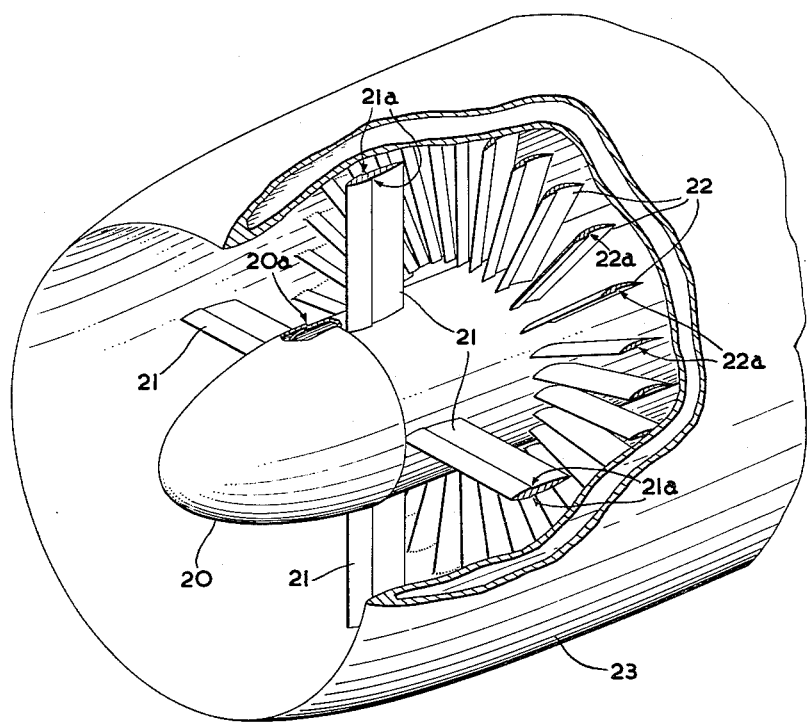

Further objects and advantages of the invention will become apparent from a study of the following specification when taken in conjunction with the accompanying drawings in which:

FIGURE 1 is a diagrammatic view showing the means of the invention in a greatly enlarged form, the view being a cross-section taken in a direction parallel to the direction of gas flow past the surface; and, FIGURE 2 is a fragmentary perspective view of an air intake duct of a gas turbine engine, showing the means of the invention applied to various of the elements of the engine.

Referring now to FIGURE 1, the means of the invention includes an upstream surface portion 10, a downstream surface portion 11, and an intermediate surface portion 12 which provides a transition between a downstream edge (indicated at 13) of the upstream surface portion 10, and the downstream portion 11.

The intermediate surface portion 12 is shown as having the form of a step, the riser of which extends in a direction perpendicular to the downstream surface portion 11, and faces in a downstream direction, but, if desired, the intermediate surface portion 12 may be arranged at an acute angle to the downstream surface portion 11, as is indicated at 12a, or may be arranged at an obtuse angle to the downstream surface portion 11, as indicated in the chain-dotted lines 12b, without materially affecting the performance of the means of the invention.

The direction of flow of the gaseous fluid past the surface is indicated by the arrows 14 in FIGURE 1, and droplets of moisture which have been formed on the upstream surface portion 10 by precipitation from the gaseous fluid are indicated at 15. As will be apparent, any moisture precipitated on the upstream surface portion 10 will be carried across that surface in a downstream direction by the flow of gaseous fluid, and will eventually appear as the droplets 15 moving towards the downstream edge 13 of the upstream surface portion 10.

When the speed of flow of the gaseous fluid across the surface is of the order of or in excess of 50 feet per second, it is found that the droplets are accelerated across the upstream surface portion in a downstream direction and approach the downstream edge 13 with a velocity such that they immediately break loose from the edge and continue to travel in a downstream direction, as indicated by the arrow 15a, in a path which is clear of the downstream surface portion 11. Other factors may contribute to the fact that the droplets do not reach the downstream surface portion 11, and among those factors may be included the ones that eddy currents formed behind the intermediate surface portion 12 will tend to lift the droplets away from the downstream surface portion 11, and also, the droplets will tend to skate across the relatively slow moving layer of gaseous fluid immediately adjacent the surface of the downstream surface portion 11.

In practice it has been found that with a step of between 0.100 inch and 0.050 inch the means of the invention performs with great efficiency when the speed of gas flow past the surface is in excess of 50 feet per second.

Referring now to FIGURE 2, a nose bullet of the engine is indicated at 20, intake spokes of the engine at 21, and first stator stage blades of a compressor of the engine at 22, the spokes 21 and the blades 22 extending between the nose bullet 20 and the cowling 23 of the engine.

The means of the invention is shown in FIGURE 2 as being applied to the nose bullet 20, the intake spokes 21, and to each of the blades 22, the means of the invention in the case of the nose bullet 20 being indicated in cross-section at 20a, and in the case of the intake spokes 21 and the blades 22 being indicated at 21a, 22a, respectively.

In each case the step 20a, 21a or 22a extends throughout the circumference or length of the member with which it is associated.

The means of the invention may be applied with equal facility and with equal advantage to other structures traversed by a high-velocity flow of gaseous fluid, for example, it may be applied to supporting struts employed in the test section of wind tunnels and the like, or to the aerofoil surfaces of aircraft, particularly to small projecting members such as antennae. Also, it may be used in combination with conventional thermal or chemical de-icing means to confine the build up of ice accretions to predetermined areas where the thermal or chemical de-icing means can operate with greater facility and economy.

What I claim as my invention is:
1. Means for removing moisture from an exterior sur- face of a strut extending across an air intake duct of a gas turbine engine, said means comprising an upstream aerofoil surface portion of the strut terminating in a downstream edge which is transverse to the direction of fluid flow across that surface, a surface portion of the strut at said downstream edge which extends inwardly of the aerofoil surface of the strut in a direction substantially perpendicular to the adjacent surface of said upstream aerofoil surface portion, and a downstream aerofoil surface portion of the strut extending from the inwardly extending surface portion in a downstream direction, the downstream surface portion extending parallel to a theoretical continuation of the upstream aerofoil surface portion in a downstream direction and being spaced inwardly of said theoretical continuation by the height of said inwardly extending surface portion.

2. In a gas turbine engine, a strut extending across an air intake duct of the engine, the strut having an exterior aerofoil surface comprised by an upstream aerofoil surface portion of the strut, a downstream aerofoil surface portion of the strut, and an intermediate portion of the strut providing a transition between the upstream and downstream surface portions, the intermediate portion providing a step in said aerofoil surface of the strut which extends transverse to the direction of fluid flow across said surface and which faces in a downstream direction, the downstream surface portion extending parallel to a theoretical continuation of the upstream aerofoil surface portion in a downstream direction and being spaced inwardly of said theoretical continuation by the height of said intermeditae surface portion.

3. Means for removing moisture from an exterior surface of a stator blade of a compressor of a gas turbine engine, said means comprising an upstream aerofoil surface portion of the stator blade terminating in a downstream edge which is transverse to the direction of fluid flow across that surface, a surface portion of the stator blade at said downstream edge which extends inwardly of the aerofoil surface of the stator blade in a direction substantially perpendicular to the adjacent surface of said upstream aerofoil surface portion, and a downstream aerofoil surface portion of the stator blade extending from the inwardly extending surface portion in a downstream direction, the downstream surface portion extending parallel to a theoretical continuation of the upstream aerofoil surface portion in a downstream direction and being spaced inwardly of said theoretical continuation by the height of said inwardly extending surface portion.

4. In a gas turbine engine, a stator blade of a compressor of the gas turbine engine, the stator blade having an exterior aerofoil surface comprised by an upstream aerofoil surface portion of the stator blade, a downstream aerofoil surface portion of the stator blade, and an intermediate portion of the stator blade providing a transition between the upstream and downstream surface portions, the intermediate portion providing a step in said aerofoil surface of the stator blade which extends transverse to the direction of fluid flow across said surface and which faces in a downstream direction, the downstream surface portion extending parallel to a theoretical continuation of the upstream aerofoil surface portion in a downstream direction and being spaced inwardly of said theoretical continuation by the height of said intermediate surface portion.

References Cited in the file of this patent

UNITED STATES PATENTS

| 1,688,345 | Mursch et al. | Oct. 23, 1928 |
| 1,864,803 | Clark | June 28, 1932 |
| 2,166,823 | Rosenlocher | July 18, 1939 |
| 2,261,558 | Orloff | Nov. 4, 1941 |
| 2,630,678 | Pratt | Mar. 10, 1953 |
| 2,737,898 | Andermatt et al. | Mar. 13, 1956 |
| 2,841,182 | Scala | July 1, 1958 |

FOREIGN PATENTS

| 18,046 | Great Britain | of 1906 |
| 340,379 | Great Britain | Jan. 1, 1931 |
| 456,012 | France | June 9, 1913 |
| 463,657 | Italy | Mar. 21, 1951 |
| 498,383 | Belgium | Jan. 15, 1951 |
| 503,332 | Canada | May 25, 1954 |
| 506,327 | Great Britain | May 25, 1939 |
| 750,305 | Great Britain | June 13, 1956 |
| 893,205 | France | Jan. 24, 1944 |
| 1,075,248 | France | Apr. 14, 1954 |